United States Patent Office 2,946,664
Patented July 26, 1960

2,946,664

PREPARATION OF DIBORANE

Ralph Klein, Hamden, Herbert G. Nadeau, North Haven, and Louis J. Schoen and Arthur D. Bliss, New Haven, Conn., assignors, by mesne assignments, to Olin Mathieson Chemical Corporation, a corporation of Virginia No Drawing. Filed Oct. 8, 1956, Ser. No. 614,768

9 Claims. (Cl. 23—204)

This invention relates to a new process for the production of diborane, and more particularly to a process for the production of diborane by the hydrogenation of trialkylboranes BRR'R", the alkyl groups (R, R' and R") of which contain from one to five carbon atoms, in the presence of a catalyst selected from metals of group VIII of the periodic table.

A number of processes have been advanced in the past for the production of diborane. One of the first such processes was set forth by Stock and Massenez (Stock, A. and Massenez, C., Berichte, 45, 3529 (1912)). In their process, a specially prepared magnesium boride is treated with acid to give a mixture of boron hydrides from which by tedious fractionation tetraborane can be separated. This last named material breaks down under the influence of heat to form diborane. This process requires elaborate apparatus and results, at best, in a very low yield of the desired product.

Another process which has been utilized for the production of diborane involves the reaction of an alkali metal hydride such as lithium hydride with boron trifluoride in the presence of diethyl ether. This reaction also suffers from several major disadvantages in that it involves the handling of a hazardous solvent, diethyl ether, and produces low yields of diborane, in the vicinity of 25 percent.

By the process of this invention, a method has been devised whereby diborane can be produced in good yield in a reaction involving the use of only hydrogen and a trialkylborane in the presence of a catalyst which is a metal from the group VIII of the periodic table. This process can be readily operated and provides a means whereby substantial quantities of diborane can be produced in conventional apparatus.

The following examples illustrate in detail various embodiments falling within the scope of this invention.

EXAMPLE I

In this experiment trimethylborane $(CH_3)_3B$ was hydrogenated in the presence of palladium black catalyst to give diborane.

The palladium black catalyst utilized was prepared in the following manner: Two thimbles of pure palladium were dissolved in aqua regia and the resulting solution was evaporated to dryness. To the 3.32 gm. of palladium chloride obtained from the thimbles there was added 1.00 gm. of commercial palladium chloride. In the next step the 4.32 gm. of palladium chloride was dissolved in 10.5 ml. of concentrated aqueous hydrochloric acid and 26.5 ml. of water. When solution was complete, 4.2 ml. of 37 weight percent formaldehyde solution was added and the solution made alkaline to litmus with 30 weight percent aqueous sodium hydroxide solution. The resulting slurry was stirred for five minutes and washed by decantation with ten 100 ml. portions of distilled water. Then the slurry was filtered and the palladium dried in an oven at 80° C. for three hours. Hydrogen at substantially atmospheric pressure was admitted to the catalyst container and the container and contents heated at 150° C. for 1.5 hours. The hydrogen was then removed by evacuation and the vessel was pumped on for an additional 0.5 hour at 150° C. Next dry nitrogen was admitted to the catalyst chamber and then pumped off. The catalyst was allowed to cool in vacuo and nitrogen was introduced at one atmosphere. Finally the vessel was sealed off and the catalyst (palladium black) stored under nitrogen.

In this experiment 40 mg. of palladium black catalyst prepared as described above was added to a standard 105 cc. stainless steel high pressure autoclave or bomb and the bomb was closed. By immersion in a bath cooled with liquid nitrogen, the bomb and catalyst were cooled to −196° C. and the bomb was evacuated. Then 2.5 g. of trimethylborane was condensed into the cold bomb, after which the bomb and contents were allowed to warm up to room temperature. The bomb, after being placed in the shaker mechanism, was pressured with hydrogen to a pressure of 2,000 p.s.i.g., the shaking mechanism and heater were turned on, and the bomb was heated to a temperaturue of 210° C. This reaction temperature was maintained for a period of 12 hours after which the bomb was allowed to cool to room temperature overnight. The contents of the bomb were then vented through a single trap maintained at −120° C. This trap retained the diborane produced and allowed the methane formed to escape. By infrared and mass spectrometer analyses, it was shown that the product contained in the −120° C. trap was essentially pure diborane and that the yield of diborane was 95 percent.

EXAMPLE II

Approximately 30 mg. of palladium catalyst prepared as described in Example I was placed in a 105 cc. Aminco standard stainless steel high pressure autoclave which had been flushed with nitrogen. Then 2.62 g. of triethylborane $(C_2H_5)_3B$ was poured into the bomb. The triethylborane utilized was produced by a Grignard reaction in which a boron trifluoride etherate was prepared and passed into an ether solution of ethyl magnesium bromide. The triethylborane so produced was identified by infrared analysis. During the addition of the triethylborane to the bomb an atmosphere of nitrogen was maintained around the open bomb. After the triethylborane was poured into the bomb, the bomb was closed and placed in a shaker mechanism. Hydrogen was added to the bomb until the pressure gage showed that a pressure of 2100 p.s.i.g. had been reached. The heater and rocker mechanism were started and in ¾ of an hour the bomb reached a temperature of 150° C. which was maintained for 12 hours. At the end of the 12 hour period the heater was turned off and the bomb was allowed to cool to room temperature. It was then attached to the vacuum rack and the products from the bomb were passed through two traps both maintained at −196° C. Non-condensibles were removed from the traps by isolating the traps and placing them under vacuum. A white material was condensed in the first trap while only a trace of material was to be seen in the second trap. Material in the traps was allowed to warm up to room temperature and a composite sample analyzed by infrared. Infrared showed that the gas was a mixture of diborane and ethane and that the yield of diborane was approximately 95 percent.

EXAMPLE III

In this example 40 mg. of palladium black catalyst prepared as described in Example I was added to the 105 cc. stainless steel bomb. Then 3.7 g. of tri-n-butylborane was poured into the bomb while an atmosphere of nitrogen was maintained around the borane stream being introduced into the open bomb. The bomb was placed in the shaker mechanism, closed and pressured up to a pressure of 2,000 p.s.i.g. with hydrogen. The shaking mechanism and heater were turned on and the bomb was heated to 200° C.; this temperature was maintained for a period of 12 hours. At the end of this reaction period the bomb was removed from the shaking apparatus, allowed to cool to room temperature and then vented through a trap maintained at −78° C. Gases passing through a −78° C. trap were analyzed by infrared and mass spectrograph and shown to be essentially diborane. The same tests showed that a 70 percent yield of diborane had been attained. By examination of the material retained in the −78° trap by infrared and mass spectrographic methods it was shown that this product was essentially butane.

A number of other experiments were completed in a manner similar to that described under Examples I, II and III and these experiments are set forth in Table I below.

Table I

| Trialkylborane | Bomb Pressure, p.s.i.g. | Reaction Temp., °C. | Catalyst | Reaction Time, hrs. | Quantity of Catalyst, mg. | Yield of Diborane |
|---|---|---|---|---|---|---|
| (4) Triethylborane | 500 | 200 | Palladium Black | 12 | 40 | 70% (based on Mass Spec. and IR Analyses). |
| (5) Alkylborane Triethylborane | 2,000 | 200 | Spongy Rhodium | 12 | 50 | Over 80%. |
| (6) Triethylborane | 2,000 | 200 | Spongy Platinum | 12 | 50 | Over 80%. |

Various changes can be made in the procedures described specifically above to provide other embodiments falling within the scope of this invention. Thus, in place of the palladium, rhodium and platinum metal catalysts there can be substituted other metals of group VIII of the periodic table, namely, iron, cobalt, nickel, ruthenium, osmium and iridium, and in place of the trimethyl, triethyl and tri-n-butyl boranes there can be substituted tri-n-propyl borane, tri-isobutyl borane, tri-isoamyl borane and so forth. The catalyst can be supported on a carrier, if desired. The reaction temperature and pressure will generally be from 125° C. to 350° C. (preferably 150° C. to 250° C.) and from 400 p.s.i.g. to 4000 p.s.i.g., although temperatures and pressures above and below these ranges can also be used. The reaction time can also be varied widely, but will generally be within the range from 0.5 to 20 hours.

It is claimed:

1. A method for the production of diborane which comprises maintaining a reactant consisting essentially of at least one compound of the class $B(R)_3$ wherein R is an alkyl radical containing from one to five carbon atoms in admixture with hydrogen and in contact with a catalyst selected from the group consisting of metals of periods 5 and 6 of group VIII of the periodic table at a temperature within the range from 125° C. to 350° C. and a pressure of from about 400 to 4000 p.s.i.g., and recovering diborane from the reaction mixture.

2. The method of claim 1 wherein $B(R)_3$ is trimethylborane.

3. The method of claim 1 wherein $B(R)_3$ is triethylborane.

4. The method of claim 1 wherein the catalyst is palladium.

5. The method of claim 1 wherein the catalyst is platinum.

6. The method of claim 1 wherein the catalyst is rhodium.

7. The method of claim 1 wherein $B(R)_3$ is triethylborane and the catalyst is platinum.

8. The method of claim 1 wherein $B(R)_3$ is triethylborane and the catalyst is palladium.

9. The method of claim 1 wherein $B(R)_3$ is triethylborane and the catalyst is rhodium.

References Cited in the file of this patent

UNITED STATES PATENTS 2,729,540    Fisher _____ Jan. 3, 1956